United States Patent
Brodsky

(10) Patent No.: US 6,697,811 B2
(45) Date of Patent: Feb. 24, 2004

(54) METHOD AND SYSTEM FOR INFORMATION MANAGEMENT AND DISTRIBUTION

(75) Inventor: Michael T. Brodsky, Westminster, CO (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/096,116

(22) Filed: Mar. 7, 2002

(65) Prior Publication Data

US 2003/0172073 A1 Sep. 11, 2003

(51) Int. Cl.[7] ............ G06F 17/30; G06F 7/00; G06F 15/16; G06F 15/173
(52) U.S. Cl. ............ 707/10; 707/9; 709/229; 709/223; 709/203
(58) Field of Search ............ 707/1, 102, 10, 707/9; 713/201, 168; 705/65, 1, 51; 709/203, 223, 229

(56) References Cited

U.S. PATENT DOCUMENTS

| | | | |
|---|---|---|---|
| 5,560,005 A | | 9/1996 | Hoover et al. ............ 395/600 |
| 5,671,354 A | * | 9/1997 | Ito et al. ............ 713/201 |
| 5,701,451 A | * | 12/1997 | Rogers et al. ............ 707/1 |
| 5,721,827 A | * | 2/1998 | Logan et al. ............ 709/217 |
| 5,850,442 A | * | 12/1998 | Muftic ............ 705/65 |
| 5,926,624 A | * | 7/1999 | Katz et al. ............ 709/217 |
| 6,115,040 A | * | 9/2000 | Bladow et al. ............ 345/741 |
| 6,226,618 B1 | * | 5/2001 | Downs et al. ............ 705/1 |
| 6,377,993 B1 | * | 4/2002 | Brandt et al. ............ 709/227 |
| 6,408,330 B1 | * | 6/2002 | DeLaHuerga ............ 709/217 |

* cited by examiner

Primary Examiner—Safet Metjahic
Assistant Examiner—Merilyn Nguyen
(74) Attorney, Agent, or Firm—Baker Botts L.L.P.

(57) ABSTRACT

The invention described comprises a method and system for the centralized management and decentralized execution of information and data distribution on a global scale. Managing and distributing information with a system begins with receiving a request for access to the system from a user at a multi-access manager and determining whether the request for access to the system is an approved request. A catalogue of at least one source server is displayed if the request for access to the system is approved, wherein each source server may be remote from the multi-access manager and is coupled to a respective information source. Each source server has authorized the user to access data received at the respective information source. A source server selection is received from the user. The request for data requests data accumulated at the information source coupled to the selected source server. The data is converted to a standard format, encrypted at the selected source server and transmitted from the selected source server to the user. Data can be provided either in generally immediate response to a request or, in the future, based on a schedule or the occurrence of a particular event.

23 Claims, 2 Drawing Sheets

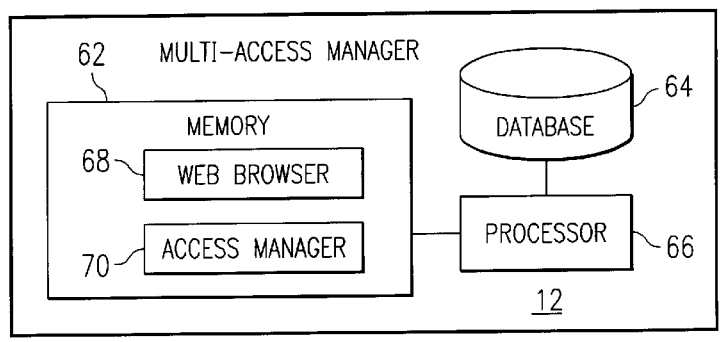
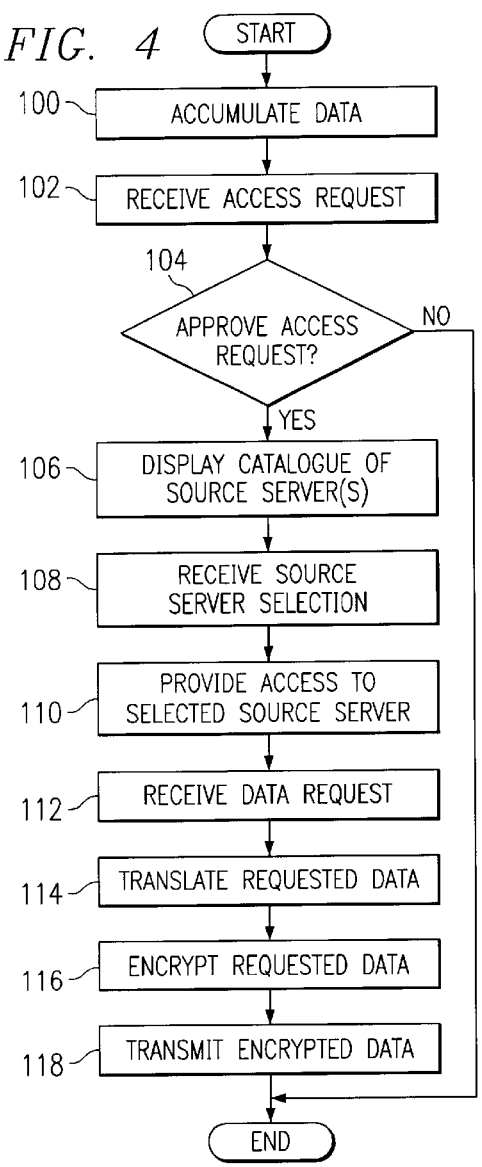
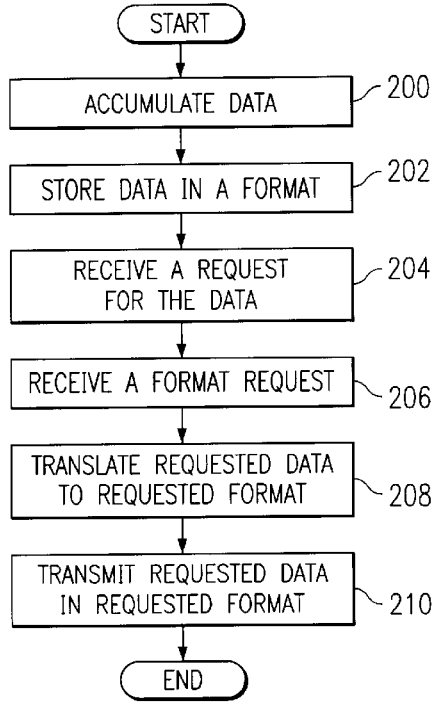

METHOD AND SYSTEM FOR INFORMATION MANAGEMENT AND DISTRIBUTION

TECHNICAL FIELD OF THE INVENTION

The present invention relates generally to network systems and more particularly, to a method and system for information management and distribution.

BACKGROUND OF THE INVENTION

Global network systems many times include private or special purpose networks at various locations each functioning to collect and communicate information throughout the global network systems. The private or special purpose networks may be located globally and may be developed and operated by different organizations. Centralized servers attached to the global network systems may be used to collect, execute and distribute the information. Different technologies may be used by the different private or special purpose networks to process distributed information. This can result in the collected information being stored in varying formats depending on which private or special purpose network is collecting and storing the information. To communicate the collected information from one private or special purpose network to another for utilization will be difficult if the format of collected or stored information is not made compatible with other private or special purpose networks.

SUMMARY OF THE INVENTION

The present invention addresses many of the problems and disadvantages associated with prior information management and distribution systems and methods.

In accordance with a particular embodiment of the present invention, a method for managing and distributing information with a system comprises receiving a request for access to the system from a user at a multi-access manager and determining whether the request for access to the system is an approved request. The method further comprises displaying a catalogue of at least one source server if the request for access to the system is approved, wherein each source server is remote from the multi-access manager and is coupled to a respective information source. Each source server authorizes the user to access data received at a respective information source. The method includes receiving a source server selection from the user, wherein the source server selection comprises a source server selected from the catalogue of at least one source server. In addition, the method of the particular embodiment comprises providing access for the user to the selected source server and receiving a data request from the user at the selected source server. The data request includes data accumulated in a first format at the information source coupled to the selected source server. The method includes encrypting the data at the selected source server and transmitting the encrypted data from the selected source server to the user.

In accordance with another embodiment, a system for managing and distributing information comprises a multi-access manager operable to receive a request for access to the system from a user and determine whether the request for access to the system is an approved request. The system further comprises a plurality of source servers coupled to the multi-access manager, wherein each source server is remote from the multi-access manager. The system also includes a plurality of information sources operable to accumulate data. Each of the information sources is coupled to a respective source server. The multi-access manager is further operable to display a catalogue of one or more of the plurality of source servers in response to an approved request for access. Each of the source servers in the catalogue has authorized the user to access data received at the coupled respective information source. The multi-access manager is further operable to receive a source server selection from the user, wherein the source server selection comprises a source server selected from the catalogue of one or more source servers. The multi-access manager is also operable to provide access for the user to the selected source server. The selected source server operates to receive a data request from the user, wherein the data request includes data accumulated in a first format at the information source coupled to the selected source server. The selected source server is also operable to encrypt the data and transmit the encrypted data to the user.

Technical advantages of particular embodiments of the present invention include a system and method that manages and distributes information using centralized management and decentralized execution. Accordingly, the system provides a user access to stored information accumulated at a plurality of remote servers while still maintaining centralized control and security over the information. The system may also be utilized with existing systems (both public and private networks) and information sources in order to reduce expenses related to utilization. The information may be provided to a user generally immediately in response to a request, on a particular schedule, in response to the occurrence of a particular event or at some other time in the future.

Another technical advantage of particular embodiments of the present invention includes a system and method for translating information collected in a variety of formats into one or more standard formats so that a user is able to view and manipulate the information. This allows a user to access and manipulate a wide variety of stored information in a timely manner despite the varying formats in which the information may be collected and stored.

Still another technical advantage of particular embodiments of the present invention is a system and method for information management and distribution having multi-tier security features. The security features protect both the system infrastructure and the information managed and stored on a multi-tiered basis. Accordingly, the risk of undesired access to or manipulation of the system and the information is reduced.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and advantages thereof, reference is now made to the following descriptions, taken in conjunction with the accompanying drawings, wherein:

FIG. 3 illustrates a multi-access manager of a system, in accordance with a particular embodiment of the present invention;

FIG. 4 illustrates a flow chart for managing and distributing information with a system, in accordance with another embodiment of the present invention; and FIG. 5 illustrates a method for translating accumulated information into a standard format, in accordance with a particular embodiment of the present invention.

DETAILED DESCRIPTION OF THE INVENTION

Figure 1:
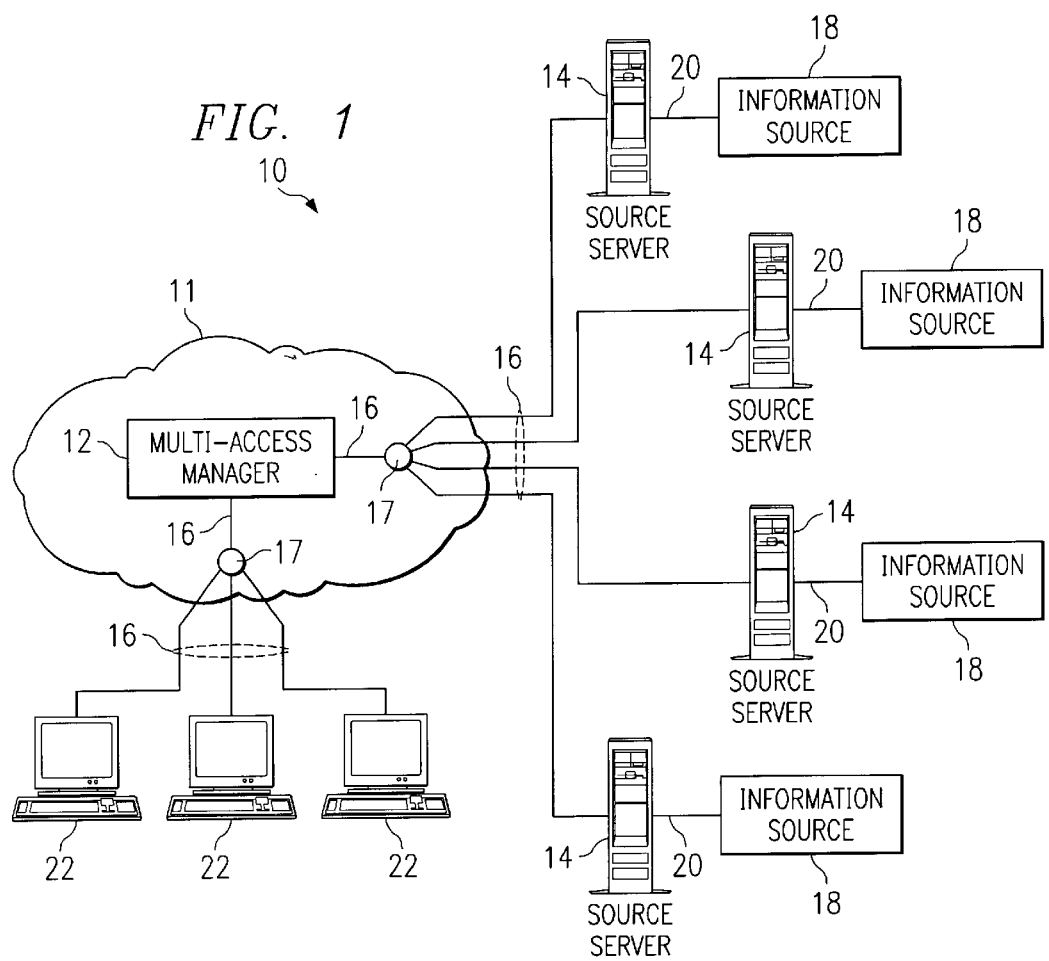
FIG. 1 illustrates a system including a multi-access manager and a plurality of source servers operable to manage and distribute information, in accordance with a particular embodiment of the present invention.

FIG. 1 illustrates a network system 10 for information management and distribution in accordance with an embodiment of the present invention. Network system 10 includes a network 11 comprising a multi-access manager (MAM) 12. MAM 12 is coupled to remote source servers 14 and to endpoints 22 through communication links 16 and nodes 17. Each source server 14 is coupled to an information source 18 through communication links 20. The teachings of the present invention provide a method and system for centralized management but decentralized execution of information distribution. Components of the system may be utilized in existing network systems.

Network 11 provides for the communication of information between source servers 14 and endpoints 22. Network 11 may be implemented as a local area network (LAN), wide area network (WAN), global distributed network, such as the internet, an intranet or an extranet, or any other form of wireless or wireline network. Network 11 includes a plurality of communication links 16 and nodes 17 that couple MAM 12 with source servers 14 and endpoints 22. Therefore, users of endpoints 22 are provided access to source servers 14 through MAM 12. Nodes 17 may include any combination of network components, endpoints, gateways or other hardware, software or embedded logic implementing any number of communication protocols that allow for the exchange of information in network system 10. Network 11 may include any number and combination of communication links 16 and nodes 17.

MAM 12 provides control over access to network system 10 by users of endpoints 22 and provides means for requesting and granting access to information received by information sources 18. MAM 12 may be included in any combination of software, firmware, hardware or other suitable components. In particular embodiments, MAM 12 may require less hardware resources than source servers 14.

Source servers 14 manage access to information received and stored by information sources 18. Each source server 14 is illustrated remote from MAM 12 such that communication between each source server 14 and MAM 12 occurs over communication links 16. Each source server 14 may be located in a different geographic location than MAM 12. Each source server 14 is configured to interface with the respective information source 18 coupled thereto. Source servers 14 control what information is accessible, when the information is accessible and how the information is translated and transmitted to a particular user of an endpoint 22. A source server 14 receives information from an information source 18 coupled thereto, translates the information into standard formats, encrypts the information and transmits the information to one or more of the endpoints 22.

Source servers 14 may limit information access to authorized users using information source-specific rules and permissions. Each source server 14 controls the external interface to a particular information source 18. Other components of network system 10 are not directly connected to the external interface of an information source 18, consequently users of network system 10 may not be able to send queries directly to the information source. Only authenticated users will have access to interact with source servers 14. Each source server 14 will in turn interact with a respective information source 18.

Source servers 14 include combinations of software, firmware, hardware or other suitable components. Component requirements of a particular source server 14 may depend on the amount of data a particular information source 18 provides. The decentralized architecture of source servers 14 minimizes a need for centralized servers for information source access, execution and distribution.

In particular embodiments, more than one source server 14 may be configured to run on the same set of hardware components. This is advantageous in situations where more than one information source 18 share common physical facilities. In this case, each source server 14 may be composed of separate instances of software components running on the same hardware components. In certain embodiments, each source server 14 instance is isolated from and invisible to other source server 14 instances running on the same hardware components. Thus, to a user accessing a particular source server 14 the appearance is that the user is accessing an isolated and autonomous unit. This ability to run more than one source server 14 instance using the same hardware components while keeping each source server 18 operationally isolated aids in reducing hardware costs while maintaining isolation and security.

Information sources 18 receive and collect information (also referred to herein as "data") to be managed by network system 10. Information sources 18 typically include any combination of hardware or software operable to receive and collect information, such as from a sensor or a weapon system. Information sources 18 may also be operable to store the received and collected information. A particular information source 18 transmits collected information to a respective source server 14 using communication links 20 thereby enabling the information to be utilized by a users of endpoints 22. Information may be collected and/or stored at information sources 18 in any of a variety of formats, and the formats in which the information is collected and/or stored may be different at different information sources 18.

Endpoints 22 typically comprise any combinations of hardware, software and/or encoded logic that provide communication services to a user. For example, an endpoint 22 includes a computer with communication hardware, software and/or encoded logic that supports communication of information using network system 10. Endpoints 22 may also include unattended or automated systems, gateways, other intermediate components or other devices that have the capability of establishing information management and utilization sessions. Although FIG. 1 illustrates a particular number and configuration of endpoints 22, network system 10 contemplates any number or arrangement of endpoints 22 for information management and distribution.

An intelligent agent in one embodiment resides on both MAM 12 and each source server 14. Both MAM 12 and source server 14 log access to all information resources by all system users. The intelligent agent uses these logs to determine if unintended or undesired use of the network system is occurring. The intelligent agent uses a rule-base residing in each system component to grant or deny future access when a user breaks certain rules. If a user has broken a rule, the user may be completely locked out of the network system.

The management of the network system 10 is centralized in MAM 12, while the execution of the distribution of the information is decentralized to source servers 14. The MAM and source server components of the system may be coupled to existing information sources (both public and private networks). Thus, the network system 10 is adaptable to be utilized in existing information network systems utilizing varying component platforms.

Network system 10 also provides multiple-tier security features to protect the system infrastructure and the information collected and distributed by the system. One level of security provided by network system 10 resides with MAM 12, since MAM 12 controls who has access to the system. Another level of security resides with source servers 14. As described below, each source server 14 protects the information received by a respective information source 18 by restricting such information to users with access to that particular source server 14. Other security features of network system 10, such as encryption of transmitted data, are described below.

Figure 2:
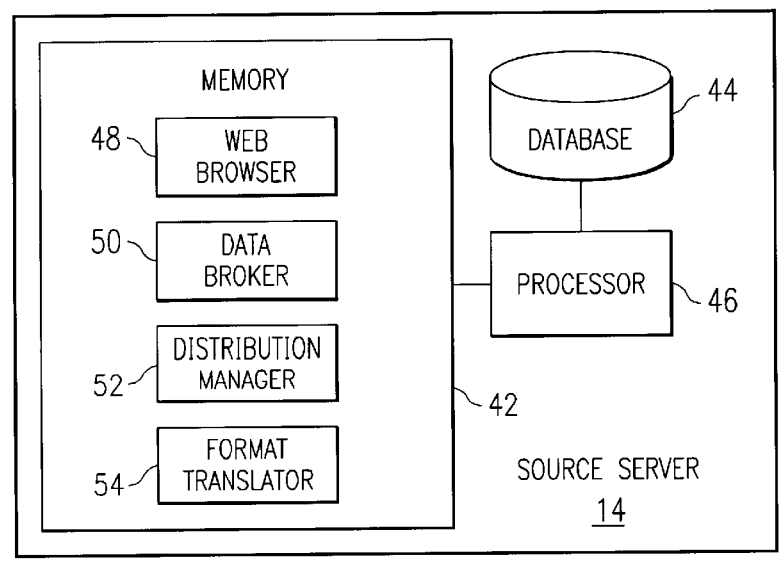
FIG. 2 illustrates a source server of a system, in accordance with a particular embodiment of the present invention.

FIG. 2 illustrates a source server 14 in accordance with an embodiment of the present invention. Source server 14 includes a memory 42, a database 44 and a processor 46. Processor 46 is typically a microprocessor, controller or any other suitable computing device or resource. Memory 42 will usually be any form of volatile or non-volatile memory including, without limitation, magnetic media, optical media, random access memory (RAM), read-only memory (ROM), removable media or any other suitable memory component. Memory 42 includes components or software executable by processor 46. Components of memory 42 may be otherwise combined and/or divided for processing within the scope of the present invention. In accordance with conventional architecture, the memory 42 includes a web browser 48, a data broker 50, a distribution manager 52 and a format translator 54.

Database 44 acts as a storage vehicle for source server 14. In particular embodiments, database 44 includes a catalogue of information products, lists of users that are allowed access to source server 14 and the limits of such accesses, logs of system activities, rules that govern special event handling, rules that govern translation of data into standard formats, schedules for data dissemination and event handling rules to manage receipt of data from the information source coupled to source server 14. In particular embodiments, database 44 is not used to store information received at the respective information source 18. Restricting the storing of information in the database 44 adds security to the network system and reduces the required database size and processing power.

Also included in the database 44 is a mapping of the types of information available at the information source 18 coupled to the particular source server 14. Associated with all the information types are user-level access lists that determine the access of each user to each specific information type or each specific information item. Before any information is transmitted from the source server 14, the source server database will be queried to determine if the intended recipient user has the proper access to the information. When access to information is approved, the information may be encrypted and transmitted to the user.

Data broker 50 aids in controlling the interface between a user and an information source 18. Data transmitted from the information source 18 to source server 14 will be collected and handled by data broker 50. Information may be collected from an information source 18 in any number of ways. For example, in particular embodiments all information received by an information source 18 would be transmitted to data broker 50. In this situation, data broker 50 sorts through the collected information to identify the information required or requested by a user. In this example, source server 14 may provide storage for collected information.

In other embodiments of the present invention, information may be transmitted from an information source 18 to data broker 50 when required and/or requested by a particular user. Still other embodiments allow a user to request a specific collection or generation of information and provide for a dialogue on the practicality of transmitting that information.

In operation, data broker 50 receives input parameters from a particular user through web browser 48. The input parameters are translated into a format enabling transmission across the system to the information sources. The information source creates a query to match the parameters passed from data broker 50. If any information or data matches the request, it will be returned using the same mechanism.

Information received by data broker 50 is transmitted to format translator 54. Rules stored in database 44 contain the necessary data conversion routine to match the particular type of information. Format translator 54 converts or translates the information into one or more standard formats to enable a particular user to view and/or manipulate the information. For example, if the information includes images, the images may be converted to a jpeg, gif and/or bitmap format.

Distribution manager 52 controls when, how and to whom the information is transmitted. When collected information has been translated and is ready for distribution to a particular user, distribution manager 52 queries the rules and permissions of database 44 to determine the approved recipients of the information. Thus, an administrator responsible for a particular source server maintains control over the access to the information accessible through that particular source server. When the recipient list is finalized, the requested information will be encrypted using a public/private key encryption system for each product category. The encrypted information is then transmitted to the user.

Each user of the network system will have a private key and a public key. Information is encrypted by distribution manager 52 using the particular public encryption key assigned to a user. The particular user who holds the key that matches the public key used to encrypt the information will be able to decrypt the information. In particular embodiments of the present invention that utilize multi-casting or broadcasting, the encryption process may involve key assignments to information products or groups of products instead of to individual users. An example of the encryption process utilizes high encryption bit-rates to ensure the protection of the transmitted information. The encryption process described herein may be utilized in addition to other encryption processes existing on systems or components of the network system.

Web browser 48 provides an interface for user interactions with the network system 10. Web browser 48 provides user authentication, display of user accessible information products and the locations thereof within the system, administration of user access permissions and access requests, user and data item permission administration and data dissemination scheduling and event handling administration. Using a web browser as the interface for user interactions with the network system may minimize the amount and level of user training to access and utilize the network system.

Components of source server 14 will be implemented using any suitable combination of software, firmware, hardware or other suitable components. Software components of source server 14 may be implemented according to any suitable software methodologies. For example, data broker 50 and format translator 42 are implemented using object-oriented software methodologies or constructs.

FIG. 3 illustrates the MAM 12 in accordance with an embodiment of the present invention. MAM 12 includes a memory 62, a database 64 and a processor 66. Processor 66 conventionally comprises a microprocessor, controller or any other suitable computing device or resource. Memory 62, for example, is any form of volatile or non-volatile memory including, without limitation, magnetic media, optical media, random access memory (RAM), read-only memory (ROM), removable media or any other suitable memory component. Memory 62 includes components or software executable by processor 66. Components of memory 62 are combined and/or divided for processing within the scope of the present invention. Memory 62 includes a web browser 68 and an access manager 70.

Database 64 acts as a storage vehicle for MAM 12. In particular embodiments, database 64 includes a catalogue of source servers and the information each source server has access to, logs of MAM 12 and system activities, lists of users allowed access to the network system and the limits of those accesses (such as the source servers each user has been authorized to access) and rules that govern system behavior, such as rules determining when and how information may be transmitted to particular users.

Access manager 70 controls access to MAM 12 and the network system and provides means for requesting and granting access to information received by information sources coupled to source servers 14. In order to gain access to the network system, a user must first be authenticated by access manager 70. The access manager 70 maintains a separate and distinct database of user-level rules and permissions, in database 64. MAM 12, through access manager 70, acts as the first gateway to grant access to information sources 18. To be a user of the network system 10, a user must first be registered in database 64. MAM 12 also contains a record of source servers 14 (and respective information sources) each specific user has permission to access. Access manager 70 will only display information regarding the existence of a source server/information source that a user has been granted access to use. In other words, access manager 70 acts as a search engine of information sources that will display a filtered list of all the possible information sources. A user will normally not be able to directly access a source server 14 without first accessing MAM 12. Thus, the user must first pass through the security checks resident in the MAM 12 before having access to the source servers 14 that MAM 12 provides.

Web browser 68 provides an interface for user interactions with MAM 12. Web browser 68 provides user authentication, display of user accessible source servers and information products, administration of user access permissions and access requests, user and data item permission administration and data dissemination scheduling and event handling administration. Using a web browser as the interface for user interactions with the MAM 12 minimizes the amount and level of user training to access and utilize the network system.

FIG. 4 illustrates a method for managing and distributing information with a system, in accordance with a particular embodiment of the present invention. The method begins at step 100, where data is accumulated at an information source 18. At step 102, an access request is received at MAM 12 from a user. The user may utilize an endpoint 22 to make such a request. At step 104, MAM 12 either approves or denies the access request. MAM 12 approves or denies the request based on the data stored in a database of MAM 12 to determine whether the particular user requesting access is listed as an authorized user. If the access request is denied, then the method ends. However, if the access request is granted, then the method proceeds to step 106 where a catalogue of accessible source server(s) 14 is displayed.

Each source server 14 displayed in the catalogue is usually remote from MAM 12 and is coupled to a respective information source 18. Each source server 14 in the catalogue has also authorized the particular user that was granted access to the source server to access data stored at the respective information source 18 coupled to the particular source server 14.

At step 108, a source server selection is received from the user that was granted access. The selected source server is selected from the catalogue of accessible source servers 14 displayed by MAM 12. The user selects the source server 14 based on the type of information the user desires to access and the type of information available to the selected source server through the information source 18 coupled to the selected source server.

If the user that has been granted access to the system desires to access a source server 14 not on the catalogue of accessible source servers provided by MAM 12, then the user may request access to a particular source server 14. In such a case, MAM 12 forwards the request to the particular source server 14, and the particular source server either grants or denies such access request. If the access request to the particular source server is granted, then MAM 12 may add that particular source server to the catalogue of accessible source servers displayed to the user as authorized to obtain information.

At step 110, MAM 12 provides access for the user to the selected source server 14. At step 112, the selected source server 14 receives a data request from the user. The data request is for data stored in the information source 18 coupled to the selected source server. When requested, the data may exist in a certain format. At step 114, the requested data is translated at the selected source server 14 to a different format. The format to which the data is translated may be a standard format so that the user is able to view and manipulate the data. In particular embodiments, the format to which the data is translated may be inherent in the data request from the user. It should be understood that in particular embodiments, the data may be translated to a different format before the data is requested by a user.

At step 116, the data is encrypted at the selected source server. The data is encrypted for protection during subsequent transmission to the user. At step 118, the encrypted data is transmitted to the user. The data may be transmitted to the user generally immediately in response to the request, on a regular schedule, in response to the occurrence of a particular event or at some other time in the future. The user may receive the data at the particular endpoint 22 through which the user accessed the network system 10.

FIG. 5 illustrates a method for translating accumulated information into a standard format, in accordance with a particular embodiment of the present invention. The method begins at step 200, where data is accumulated at an information source 18. At step 202, the data is stored in a format at the information source 18 where the data was collected. Other information sources 18 may accumulate and store data in different formats, and data may be accumulated and stored in different formats at one particular information source 18. In particular embodiments, the format in which the data is stored does not comprise a format that enables a user to manipulate the data. At step 204, a source server 14 coupled to the information source 18 which accumulated and stored the data receives a request for the accumulated and stored data. The user utilizes an endpoint 22 to make such a request.

At step 206, the source server 14 receives a format request from the user. The format request comprises a format to which the user desires the requested data to be translated. In some embodiments, the format request may comprise a format selected by the user from a catalogue of standard formats provided by the source server 14. In particular embodiments, the format request comprises a standard format that would enable the user to view and/or manipulate the requested data. For example, if the requested data comprises images, the format request may comprise a jpeg, gif and/or bitmap format. In particular embodiments, the user may not transmit a format request. In such instances, the format to which the requested data will be translated may be intrinsic to the request for the accumulated and stored data.

At step 208, the requested data is translated to the requested format at the source server 14 which received the data and format requests. At step 210, the requested data is transmitted to the user in the requested format. The user may receive the data at the particular endpoint 22 through which the user requested the data. In particular embodiments, the requested and translated data is encrypted before transmission to the user.

Although the present invention has been described in detail, various changes and modifications may be suggested to one skilled in the art. It is intended that the present invention encompass such changes and modifications as falling within the scope of the appended claims.

What is claimed is:

1. A method for managing and distributing information with a system, comprising:

receiving from a user at a multi-access manager a request for access to the system;

determining whether the request for access to the system comprises an approved access at the multi-access manager;

displaying in response to an approved access a catalogue of at least one source server, wherein each source server couples to a respective information source, and wherein each source server has authorized the user to access data stored at the coupled respective information source;

receiving a source server selection from the user, wherein the source server selection comprises a source server selected from the catalogue of at least one source server;

providing access for the user to the selected source server;

receiving a request from the user for data at the selected source server, wherein the request for data requests data accumulated in a first format at the information source coupled to the selected source server; and transmitting the data from the selected source server to the user.

2. The method of claim 1, further comprising encrypting the data at the selected source server, and wherein transmitting the data comprises transmitting the encrypted data.

3. The method of claim 2, wherein encrypting the data at the selected source server comprises encrypting the data at the selected source server using a key based encryption system.

4. The method of claim 2, further comprising translating the data from the first format to a standard format at the selected source server, and wherein transmitting the encrypted data comprises transmitting the encrypted data in the standard format.

5. The method of claim 4, further comprising receiving a format request from the user, wherein the format request comprises the standard format.

6. The method of claim 4, further comprising:

receiving a second source server selection from the user, wherein the second source server selection comprises a second source server selected from the catalogue of at least one source server;

providing access for the user to the second selected source server;

receiving a second request from the user for data at the second selected source server, wherein the second request for data requests data accumulated in a second format at the information source coupled to the second selected source server;

translating the data requested in the second request from the second format to the standard format at the second selected source server;

encrypting the data requested in the second request at the second selected source server; and transmitting the encrypted data requested in the second request from the second selected source server to the user in the standard format.

7. The method of claim 4, wherein translating the data from the first format to a standard format comprises translating the data from the first format to a data format to enable the data to be manipulated by the user.

8. The method of claim 1, further comprising:

receiving a request for access to a new source server from the user at the multi-access manager not included in the catalogue of at least one source server, and wherein the new source server couples to a respective information source;

forwarding the request for access to a new source server to the new source server; determining if the request for access to the new source server has approval at the new source server; and adding the new source server to the catalogue of at least one source server if the request for access to the new source server has approval at the new source server.

9. A system for managing and distributing information, comprising:

a multi-access manager operable to receive a request for access to the system from a user and determine if the request for access to the system comprises an approved request;

a plurality of source servers coupled to the multi-access manager;

a plurality of information sources operable to accumulate data, wherein each of the plurality of information sources couples to a respective source server of the plurality of source servers;

wherein the multi-access manager further operates to:

activate an endpoint to display a catalogue of one or more source servers from the plurality of source servers upon approval of the request for access to the system, wherein each of the one or more source servers has authorized the user to access data stored at a respective information source;

receive a source server selection from the user, wherein the source server selection comprises a source server selected from the catalogue of one or more source servers; and provide access for the user to the selected source server; and wherein the selected source server operates to:

receive a request for data from the user, wherein the request for data requests data accumulated in a first format at the information source coupled to the selected source server; and transmit the data to the user.

10. The system of claim 9, wherein the selected source server further operates to encrypt the data, and wherein transmitting the data comprises transmitting the encrypted data.

11. The system of claim 10, wherein encrypting the data comprises encrypting the data using a key based encryption system.

12. The system of claim 10, wherein the selected source server further operates to translate the data from the first format to a standard format, and wherein transmitting the encrypted data comprises transmitting the encrypted data in the standard format.

13. The system of claim 12, wherein the selected source server further operates to receive a format request from the user, wherein the format request comprises the standard format.

14. The system of claim 12, wherein:

the multi-access manager further operates to:

receive a second source server selection from the user, wherein the second source server selection comprises a second source server selected from the catalogue of one or more source servers; and provide access for the user to the second selected source server; and the second selected source server is operable to:

receive a second request for data from the user, wherein the second request for data requests data accumulated in a second format at the information source coupled to the second selected source server;

translate the data requested in the second request from the second format to the standard format;

encrypt the data requested in the second request; and transmit the encrypted data requested in the second request to the user in the standard format.

15. The system of claim 12, wherein translating the data from the first format to a standard format comprises translating the data from the first format to a data format to enable the data to be manipulated by the user.

16. The system of claim 9, wherein the multi-access manager further operates to:

receive a request for access to a new source server of the plurality of source servers from the user not included in the catalogue of one or more source servers;

forward to the new source server the request for access to a new source server; and add the new source server to the catalogue of one or more source servers if the request for access to the new source server has approval at the new source server.

17. An apparatus for managing and distributing information, comprising:

means for receiving from a user at a multi-access manager a request for access to the system;

means for determining whether the request for access to the system comprises an approved access at the multi-access manager;

means for displaying in response to an approved access a catalogue of at least one source server, wherein each source server couples to a respective information source, and wherein each source server has authorized the user to access data stored at the coupled respective information source;

means for receiving a source server selection from the user, wherein the source server selection comprises a source server selected from the catalogue of at least one source server; and means for providing access for the user to the selected source server;

means for receiving a request from the user for data at the selected source server, wherein the request for data requests data accumulated in a first format at the information source coupled to the selected source server; and means for transmitting the data from the selected source server to the user.

18. The apparatus of claim 17, further comprising means for encrypting the data at the selected source server, and wherein means for transmitting the data comprises means for transmitting the encrypted data.

19. The apparatus of claim 18, further comprising means for translating the data from the first format to a standard format at the selected source server, and wherein means for transmitting the encrypted data comprises means for transmitting the encrypted data in the standard format.

20. Logic encoded in media for managing and distributing information, the logic operable to perform the following steps:

receive from a user at a multi-access manager a request for access to the system;

determine whether the request for access to the system comprises an approved access at the multi-access manager;

display in response to an approved access a catalogue of at least one source server, wherein each source server couples to a respective information source, and wherein each source server has authorized the user to access data stored at the coupled respective information source;

receive a source server selection from the user, wherein the source server selection comprises a source server selected from the catalogue of at least one source server; and provide access for the user to the selected source server;

receive a request from the user for data at the selected source server, wherein the request for data requests data accumulated in a first format at the information source coupled to the selected source server; and transmit the data from the selected source server to the user.

21. The logic encoded in media of claim 20, wherein the logic is further operable to encrypt the data at the selected source server, and wherein logic operable to transmit the data comprises logic operable to transmit the encrypted data.

22. The logic encoded in media of claim 21, wherein the logic is further operable to translate the data from the first format to a standard format at the selected source server, and wherein logic operable to transmit the encrypted data comprises logic operable to transmit the encrypted data in the standard format.

23. A method for managing and distributing information with a system, comprising:

receiving from a user at a multi-access manager a request for access to the system;

determining whether the request for access to the system comprises an approved access at the multi-access manager;

displaying in response to an approved access a catalogue of at least one source server, wherein each source server couples to a respective information source, and wherein each source server has authorized the user to access data stored at the coupled respective information source;

receiving a source server selection from the user, wherein the source server selection comprises a source server selected from the catalogue of at least one source server;

providing access for the user to the selected source server;

receiving a request from the user for data at the selected source server, wherein the request for data requests data accumulated in a first format at the information source coupled to the selected source server;

querying a database of the selected source server to determine if the user has approved access to the requested data; and transmitting the data from the selected source server to the user in response to an approved access to the requested data.

* * * * *